United States Patent
Ramesh et al.

(10) Patent No.: US 6,909,758 B2
(45) Date of Patent: Jun. 21, 2005

(54) SYSTEMS AND METHODS FOR DECODING DATA BLOCKS

(75) Inventors: Rajaram Ramesh, Cary, NC (US); Havish Koorapaty, Cary, NC (US)

(73) Assignee: Telefonaktiebolaget LM Ericsson (publ) (SE)

( * ) Notice: Subject to any disclaimer, the term of this patent is extended or adjusted under 35 U.S.C. 154(b) by 803 days.

(21) Appl. No.: 09/842,928

(22) Filed: Apr. 27, 2001

(65) Prior Publication Data

US 2002/0159545 A1 Oct. 31, 2002

(51) Int. Cl.$^7$ ................................................ H03D 1/00
(52) U.S. Cl. ................. 375/340; 375/295; 375/147; 370/347; 370/329; 370/465; 714/751
(58) Field of Search .................... 375/340, 295, 375/147, 261; 370/347, 329, 465; 714/751

(56) References Cited

U.S. PATENT DOCUMENTS

| | | | |
|---|---|---|---|
| 5,764,699 A | * | 6/1998 | Needham et al. ........... 375/261 |
| 6,138,260 A | | 10/2000 | Ketseoglou ................. 714/751 |
| 6,208,663 B1 | * | 3/2001 | Schramm et al. ........... 370/465 |
| 6,671,328 B1 | * | 12/2003 | Poon et al. .................. 375/295 |
| 6,697,986 B2 | * | 2/2004 | Kim et al. ................... 714/751 |
| 2003/0063583 A1 | * | 4/2003 | Pavovani et al. | |

FOREIGN PATENT DOCUMENTS

| | | |
|---|---|---|
| WO | WO 99/12303 | 3/1999 |
| WO | WO 00/49760 | 8/2000 |

* cited by examiner

Primary Examiner—Shuwang Liu
Assistant Examiner—Eva Zheng
(74) Attorney, Agent, or Firm—Coats & Bennett, P.L.L.C.

(57) ABSTRACT

Systems and methods for decoding data blocks enable a receiving device to decode a retransmitted data block using previously stored bits. A receiver demodulates a data block transmitted via a first modulation scheme. When the receiver is not able to decode the data block correctly, the transmitter may retransmit the data block as a number of split blocks via a different modulation scheme. The receiver may then combine the bits generated by demodulating the original data block with bits generated by demodulating the retransmitted data block. The receiver then decodes the combined bits.

45 Claims, 6 Drawing Sheets

SYSTEMS AND METHODS FOR DECODING DATA BLOCKS

BACKGROUND OF THE INVENTION

The present invention relates generally to communications and, more particularly, to decoding communications in networks.

Communication systems use a number of techniques to maximize the overall bit rate when transmitting data. For example, an adaptive modulation scheme generally estimates the channel quality and selects the most appropriate modulation scheme for data transmissions to maximize the bit rate.

Another common method of dealing with variations in channel quality is incremental redundancy. In an incremental redundancy scheme, a transmitting device transmits an initial data block with relatively few redundancy bits, yielding a high bit rate if decoding at the receiving device is successful. If decoding fails, additional redundancy bits are transmitted until the decoding is successful.

BRIEF SUMMARY OF THE INVENTION

In accordance with the invention as embodied and broadly described herein, a method for decoding data blocks is provided. The method comprises demodulating a first data transmission transmitted via a first modulation scheme to obtain a first sequence of bits, the first sequence of bits representing a first data block including a first payload; detecting an error associated with the first data block; and storing the first sequence of bits. The method also includes demodulating a second data transmission transmitted via a second modulation scheme to obtain a second sequence of bits, the second sequence of bits representing a second data block comprising a second payload where the second payload includes at least a portion of the first payload. The method further includes combining a portion of the first sequence of bits with a portion of the second sequence of bits to obtain a third sequence of bits; appending an other portion of the first sequence of bits to the third sequence of bits to obtain a fourth sequence of bits; and decoding the fourth sequence of bits to obtain the first data block.

In another implementation consistent with the present invention, a computer-readable medium having stored sequences of instructions is provided. The instructions when executed by at least one processor cause the processor to demodulate a first data transmission transmitted via a first modulation scheme to obtain a first sequence of bits, where the first sequence of bits represents a first data block including a first payload. The instructions also cause the processor to detect an error associated with the first data block and store the first sequence of bits. The instructions further cause the processor to demodulate a second data transmission transmitted via a second modulation scheme to obtain a second sequence of bits, where the second sequence of bits represents a second data block having a second payload that includes a portion of the first payload. The instructions also cause the processor to combine a portion of the first sequence of bits with a portion of the second sequence of bits to obtain a third sequence of bits, append an other portion of the first sequence of bits to the third sequence of bits to obtain a fourth sequence of bits and decode the fourth sequence of bits to obtain the first data block.

In a further implementation consistent with the present invention, a device for decoding data blocks is provided. The device includes a memory for storing soft bits generated by demodulating data blocks and a receiver that demodulates a first data block transmitted via a first modulation scheme. The receiver transmits a negative acknowledgement message to a transmitting device, when an error is detected in the first data block and demodulates a second data block transmitted via a second modulation scheme. The receiver identifies the second data block as being part of a split data block and combines a portion of the soft bits associated with the first data block with a portion of the soft bits associated with the second data block to obtain a first sequence of bits. The receiver also appends an other portion of the soft bits associated with the first data block to the first sequence of bits to obtain a second sequence of bits and decodes the second sequence of bits to obtain the first data block.

In still another implementation consistent with the present invention, a mobile terminal is provided. The mobile terminal includes a memory that stores data bits generated by demodulating data blocks. The mobile terminal also includes a receiver that demodulates a first data block including a first payload, where the first data block is transmitted via an eight phase shift keying (8PSK) modulation scheme. The receiver also detects an error in the first data block, stores a first set of data bits associated with the first data block in the memory and transmits a negative acknowledgement message to a transmitting device that transmitted the first data block when an error is detected. The receiver further demodulates a second data block transmitted via a Gaussian minimum shift keying (GMSK) modulation scheme to obtain a second set of bits, where the second data block includes a second payload comprising a portion of the first payload. The receiver also combines a portion of the second set of bits with a portion of the first set of bits to obtain a first sequence of bits and appends an other portion of the first set of bits to the first sequence of bits to obtain a second sequence of bits. The receiver decodes the second sequence of bits to obtain the first data block.

In yet another implementation consistent with the present invention, a device for decoding data blocks is provided. The device includes a memory that stores first probability information associated with a demodulated first data block. The device also includes a MAP decoder that receives an input bit sequence corresponding to a second data block, where the first and second data blocks are transmitted via different modulation schemes and the second data block includes a portion of the first data block. The MAP decoder also outputs second probability information associated with the second data block using the first probability information. The device further includes a processing device that converts the output from the MAP decoder to a binary sequence of bits representing the first data block.

BRIEF DESCRIPTION OF THE DRAWINGS

The accompanying drawings, which are incorporated in and constitute a part of this specification, illustrate the invention and, together with the description, explain the invention. In the drawings.

DETAILED DESCRIPTION OF THE INVENTION

The following detailed description of the invention refers to the accompanying drawings. The same reference numbers in different drawings identify the same or similar elements. Also, the following detailed description does not limit the invention. Instead, the scope of the invention is defined by the appended claims and equivalents.

Systems and methods consistent with the present invention enable a receiving device to decode a retransmitted data block using previously stored bits associated with the original data block, where the retransmitted data block was transmitted using a different modulation scheme than the original data block.

Figure 1:
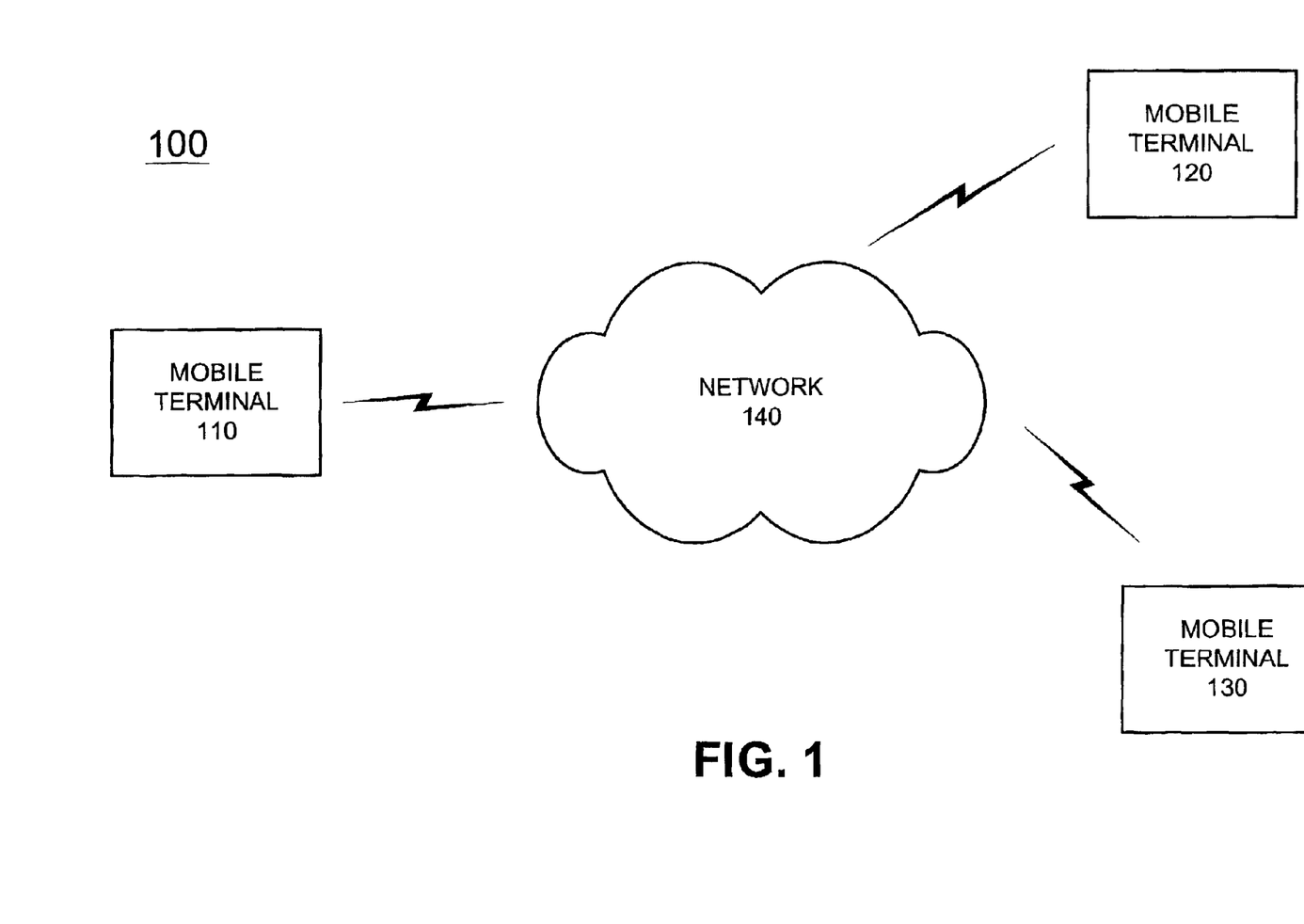
FIG. 1 is a diagram of an exemplary system in which methods and systems consistent with the present invention may be implemented.

FIG. 1 is a diagram of an exemplary system 100 in which methods and systems consistent with the present invention may be implemented. The system 100 may include a number of mobile terminals 110, 120 and 130 connected via network 140. Only three mobile terminals 110, 120 and 130 are shown for simplicity. It should be understood that system 100 may include other numbers of mobile terminals.

The present invention is described herein in the context of a mobile terminal. As used herein, the term "mobile terminal" may include a cellular radiotelephone with or without a multi-line display; a Personal Communications System (PCS) terminal that may combine a cellular radiotelephone with data processing, facsimile and data communications capabilities; a personal digital assistant (PDA) that can include a radiotelephone, pager, Internet/Intranet access, Web browser, organizer, calendar and/or a global positioning system (GPS) receiver; and a conventional laptop and/or palmtop receiver or other appliance that includes a radiotelephone transceiver. Mobile terminals 110, 120 and 130 may also be referred to as "pervasive computing" devices.

Network 140 may include one or more networks including a cellular network, a satellite network, the Internet, a telephone network, such as the Public Switched Telephone Network (PSTN), a metropolitan area network (MAN), a local area network (LAN) or another type of network. The mobile terminals 110, 120 and 130 may communicate with each other over network 140 via wired, wireless or optical connections.

In an exemplary implementation, network 140 includes a cellular network that uses conventional components for transmitting data to and from mobile terminals 110, 120 and 130. Such components may include base station antennas (not shown) that transmit and receive data from mobile terminals within their vicinity. Such components may also include base stations (not shown) that connect to the base station antennas and communicate with other devices, such as switches and routers (not shown) in accordance with conventional techniques.

Figure 2:
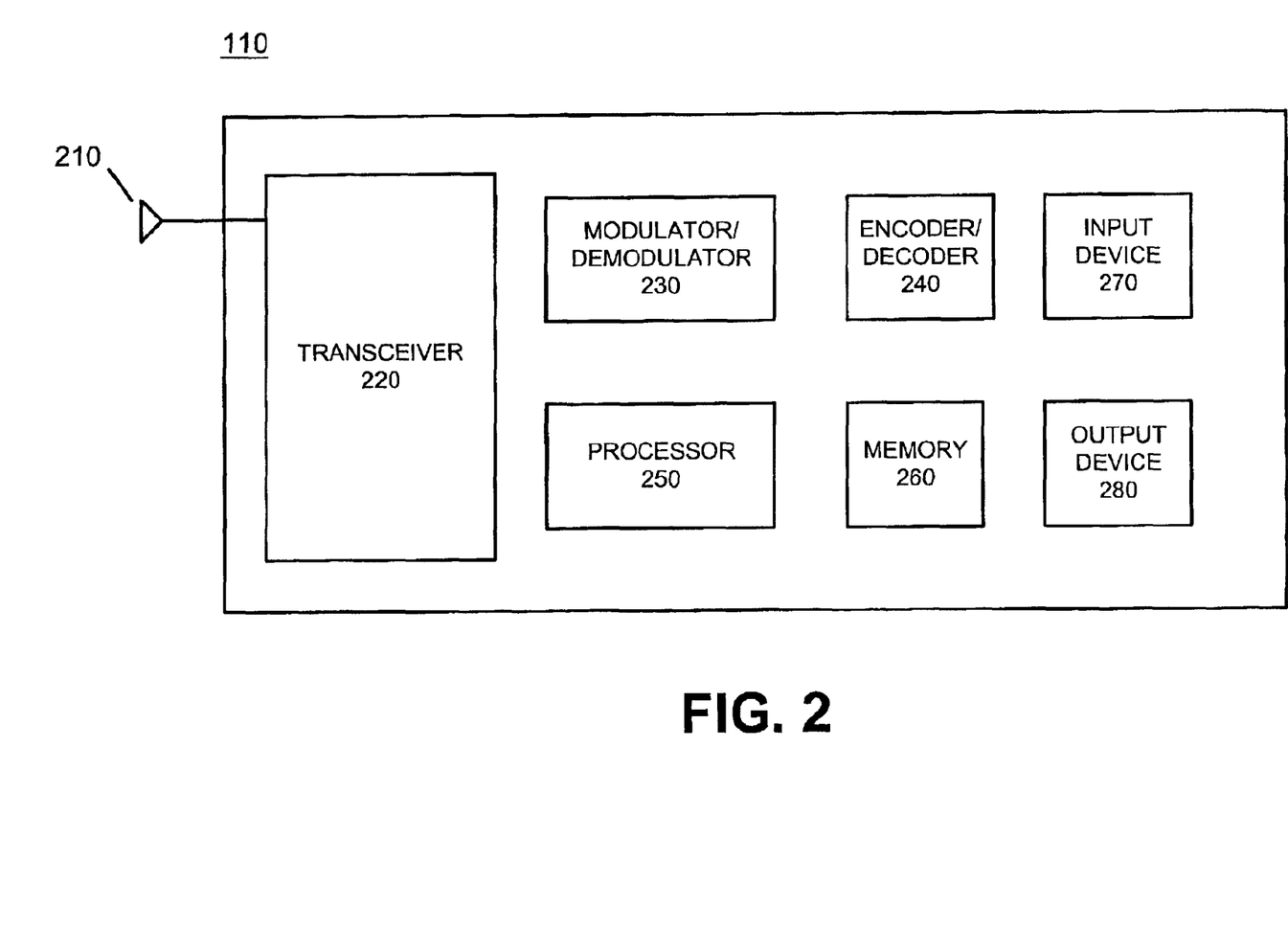
FIG. 2 is a diagram of an exemplary mobile terminal according to an implementation consistent with the present invention.

FIG. 2 is a diagram of a mobile terminal 110 according to an exemplary implementation consistent with the present invention. It should be understood that mobile terminals 120 and 130 may include the same or similar elements and may be configured in the same or a similar manner.

The mobile terminal 110 may include one or more radio frequency (RF) antennas 210, a transceiver 220, a modulator/demodulator 230, an encoder/decoder 240, a processor 250, a memory 260, an input device 270 and an output device 280. These components may be connected via one or more buses (not shown). In addition, mobile terminal 110 may include one or more power supplies (not shown). One skilled in the art would recognize that the mobile terminal 110 may be configured in a number of other ways and may include other elements.

The RF antenna 210 may include a conventional antenna capable of transmitting and receiving RF signals. The transceiver 220 may include conventional components for transmitting and receiving information via RF antenna 210. In an alternative implementation, the transceiver 220 may take the form of separate transmitter and receiver components, instead of being implemented as a single component. The modulator/demodulator 230 may include conventional components that combine data signals with carrier signals and extract data signals from carrier signals. The modulator/demodulator 230 may include conventional components that convert analog signals to digital signals, and vice versa, for communicating with other devices in mobile terminal 110.

The encoder/decoder 240 may include conventional circuitry for encoding a digital input to be transmitted and for decoding a received encoded input. For example, the encoder portion of the encoder/decoder 240 may include a conventional convolutional encoder for encoding a signal. The encoder portion may also include a conventional puncturing circuit that removes selected bits from the encoded output from the encoder, as described in more detail below. The decoder portion of the encoder/decoder 240 may include a conventional depuncturing circuit for depuncturing a punctured data block, as described in more detail below. The decoder portion may also include a conventional convolutional decoder, such as a Viterbi decoder.

The processor 250 may include any type of conventional processor or microprocessor that interprets and executes instructions. The memory 260 may include a conventional random access memory (RAM) or another type of dynamic storage device that stores information and instructions for execution by the processor 250; a read only memory (ROM) or another type of static storage device that stores static information and instructions for use by processor 250; and/or some other type of magnetic or optical recording medium and its corresponding drive. Instructions used by the processor 250 may also, or alternatively, be stored in another type of computer-readable medium accessible by processor 250. In general, a computer-readable medium may include one or more memory devices.

The input device 270 may include any conventional mechanism that permits an operator to input information to the mobile terminal 110, such as a microphone, a keyboard, a keypad, a mouse, a pen, voice recognition and/or biometric mechanisms, etc. The output device 280 may include any conventional mechanism that outputs information to the operator, including a display, a printer, a speaker, etc.

Figure 3:
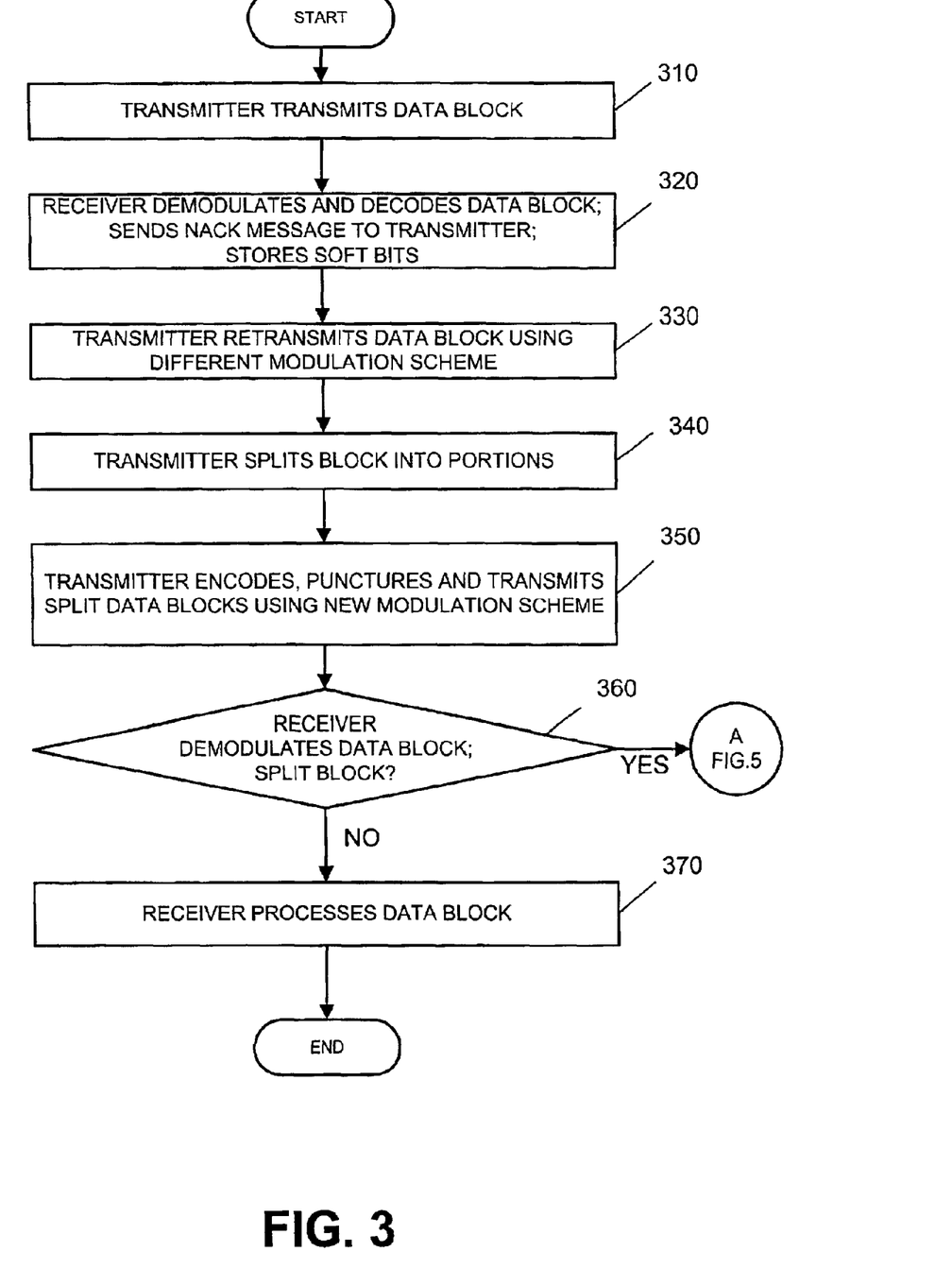
FIG. 3 is a flow diagram illustrating exemplary processing by mobile terminals in an implementation consistent with the present invention.

FIG. 3 is a flowchart illustrating processing by mobile terminals in an exemplary implementation consistent with the present invention. Processing begins when a mobile terminal, such as mobile terminal 120, transmits a data block via network 140 (step 310). The mobile terminal 120, referred to as the transmitter in the following description, transmits the data block in a conventional manner.

For example, assume that the system in FIG. 1 operates in accordance with the Enhanced General Packet Radio Service (EGPRS) protocol. Further, assume that the transmitter encodes the data block using a conventional coding scheme, such as modulation and coding scheme 7 (MCS-7) according to the Enhanced Date Rates for Global System for Mobile Communications and time division multiple access (TDMA)/136 Evolution (EDGE) protocol.

Figure 4A:
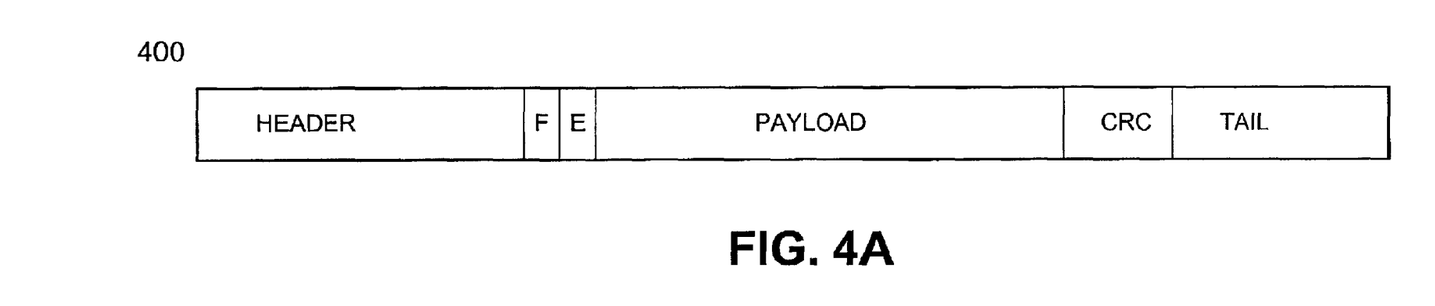
FIGS. 4A and 4B illustrate data blocks transmitted in an exemplary implementation consistent with the present invention.

FIG. 4A illustrates a data block 400 transmitted in an exemplary implementation consistent with the present invention. Data block 400 includes header, F, E, payload, cyclic redundancy check (CRC) and tail fields. The header field includes information indicating the coding and puncturing scheme used on the data block and whether the data block is part of a split block, as described in more detail below. The F and E fields include information used by higher protocol layers. For example, the F field may store a final block indicator (FBI) and the E field may store extension header information. The F and E fields are typically needed for large data blocks. The payload field represents the actual user data portion of data block 400. The CRC field includes a CRC code that may be used to determine whether the data block 400 was received correctly. The tail field includes information used to terminate the trellis of the convolutional encoder in a known state.

In MCS-7, the size of the data block consisting of the F, E, payload, CRC and tail fields is 468 bits. In this case, the transmitter may encode these fields using a rate ⅓ convolutional code that outputs three coded bits for every information bit. That is, the transmitter outputs 1404 bits (468× 3).

The transmitter, in an exemplary implementation of the present invention, may then puncture the coded data block using a conventional puncturing scheme to yield 612 bits. That is, the transmitter may remove a number of the 1404 coded bits to produce a coded and punctured data block consisting of 612 bits. In other words, the coded and punctured data block is a subset of the coded data block. In some implementations of the present invention, the transmitter may perform more than one puncturing operation, e.g., three puncturing operations. The three puncturing operations may be performed on three different copies of the data block and facilitate decoding of the data block by a receiver.

It should be understood that the convolutional coding and decoding, as well as the puncturing and depuncturing operations, described herein may be performed by encoder/decoder 240. It should also be understood that the modulating and demodulating operations described herein may be performed by modulator/demodulator 230. Alternatively, the coding, decoding, puncturing, depuncturing, modulating and demodulating may be performed by processor 250 operating in response to the execution of sequences of instructions stored in memory 260.

The transmitter may then append a header to the coded and punctured data block. The header includes information indicating the coding and puncturing scheme used on the data block. The header may also include information identifying the particular punctured copy and sequence number. The transmitter then modulates the coded and punctured data block according to the modulation scheme being used. For example, using MCS-7 according to the EDGE protocol, the transmitter may modulate the coded and punctured data block using an eight phase shift keying (8PSK) scheme.

Assume that another mobile terminal, such as mobile terminal 110, is the intended destination of the data block. The mobile terminal 110, referred to as the receiver in the following description, receives the coded and punctured data block. It should be understood that mobile terminal 110 may receive the data block via conventional devices, such as a base station and base station antenna, included in network 140. The receiver then demodulates the coded and punctured data block and determines the coding and puncturing scheme used to code the block, based on information contained in the header (step 320).

The receiver may then depuncture the coded and punctured data block. For example, in one implementation, the receiver inserts zeros in positions where it is known that the bits in the originally coded data block were "punctured," i.e., removed. In the example described above, the receiver may depuncture the 612 coded and punctured bits to obtain 1404 bits. The receiver may then decode the block and determine whether the 1404 bit block was received correctly, i.e., that no errors were introduced during transmission. For example, the receiver may use the CRC code transmitted with the data block to determine whether the data block was received correctly.

Assume that block 400 was not received correctly. The receiver may then send a negative acknowledgement (NACK) message to the transmitter (step 320). The receiver may also store the bits generated by demodulating the coded and punctured data block (step 320). The bits generated from demodulating the block may be referred to as "soft" bits. The soft bits are typically real values whose sign indicates the bit and the magnitude indicates the reliability of the bit decision. Thus, a large positive value conveys with great confidence that the bit is a "1," whereas a small negative value conveys that the bit is likely a "0," but with low confidence. The stored data bits may also include the depunctured bits. That is, the receiver may store a block containing 1404 bits that includes soft bits in some positions and zeros in other positions resulting from the depuncturing. This stored information may be used to facilitate decoding of the data block at a later time, as described in detail below.

The transmitter receives the NACK message and retransmits the data block (step 330). According to an exemplary implementation of the present invention, assume that the transmitter wishes to transmit the data block using a different modulation scheme, either because the receiver has attempted to decode the transmitted block a number of times without success or for some other reason. For example, assume that the transmitter transmitted the original data block using MCS-7. Further assume that the protocol being used allows the transmitter to change modulation schemes on retransmission and that the transmitter retransmits the data block using MCS-2 according to the EDGE protocol. It should be noted that systems operating according to the EDGE protocol permit a transmitter to change modulation schemes on retransmission.

In this example, the transmitter transmits the data block according to MCS-2 using Gaussian minimum shift keying (GMSK) modulation. A GMSK data block, however, cannot carry the same amount of payload information as that carried using 8PSK. Accordingly, the transmitter may then split the data block into two or more blocks (step 340).

Figure 4B:
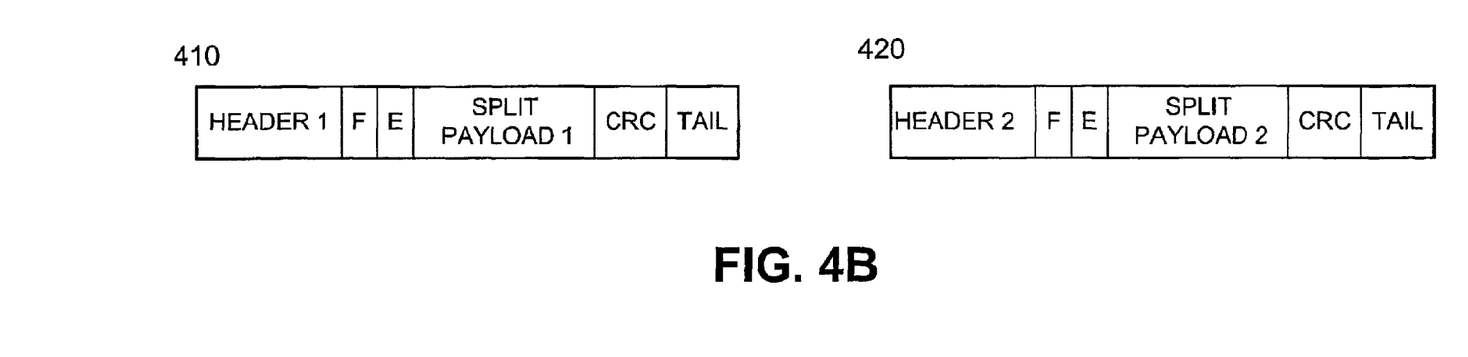

FIG. 4B illustrates split data blocks 410 and 420 transmitted in an exemplary implementation consistent with the present invention. Split data blocks 410 and 420 each include header, F, E, split payload, CRC and tail fields. In MCS-2, the data block size consisting of the F, E, payload, CRC and tail fields is 244 bits. The split payload 1 field of block 410 includes one half of the bits originally transmitted in the payload field of data block 400 and the split payload 2 field of block 420 includes the second half of the data bits from the payload field of block 400. The transmitter then encodes data blocks 410 and 420 according to MCS-2, punctures the coded data block and transmits the coded and punctured split data blocks 410 and 420, respectively, using GMSK modulation (step 350, FIG. 3).

In an exemplary implementation, the transmitter may encode data blocks 410 and 420 using a rate ⅓ convolutional coding scheme that outputs 732 bits (244×3 bits). The transmitter may then puncture these 732 bits using a conventional puncturing scheme to yield 372 bits. In some implementations of the present invention, the transmitter may perform two puncturing operations with each operation yielding a block of 372 bits. The two puncturing operations may be performed on two different copies of the data block and facilitates decoding of the data block by a receiver. The transmitter may then append a header to the 372-bit coded and punctured block and transmits the block to the receiver.

The receiver receives the data transmission and demodulates the block (step 360). The receiver may then determine whether the block is a split block using the header information (step 360). If the block is not a split block, the receiver processes the block in a conventional manner (step 370).

Assume, however, based on information contained in the header, that the block is a split block and, more particularly, that the block is the first of two split blocks, i.e., split data block 410. The receiver then depunctures the block in a conventional manner (step 510, FIG. 5). For example, in the exemplary scenario described above (i.e., data block transmitted using MCS-2 and rate ⅓ convolutional coding), the receiver first demodulates the coded and punctured block to obtain 372 soft bits corresponding to the F, E, split payload 1, CRC and tail fields of data block 410. The receiver then depunctures the 372 bits to obtain a block of 732 bits.

Figure 5:
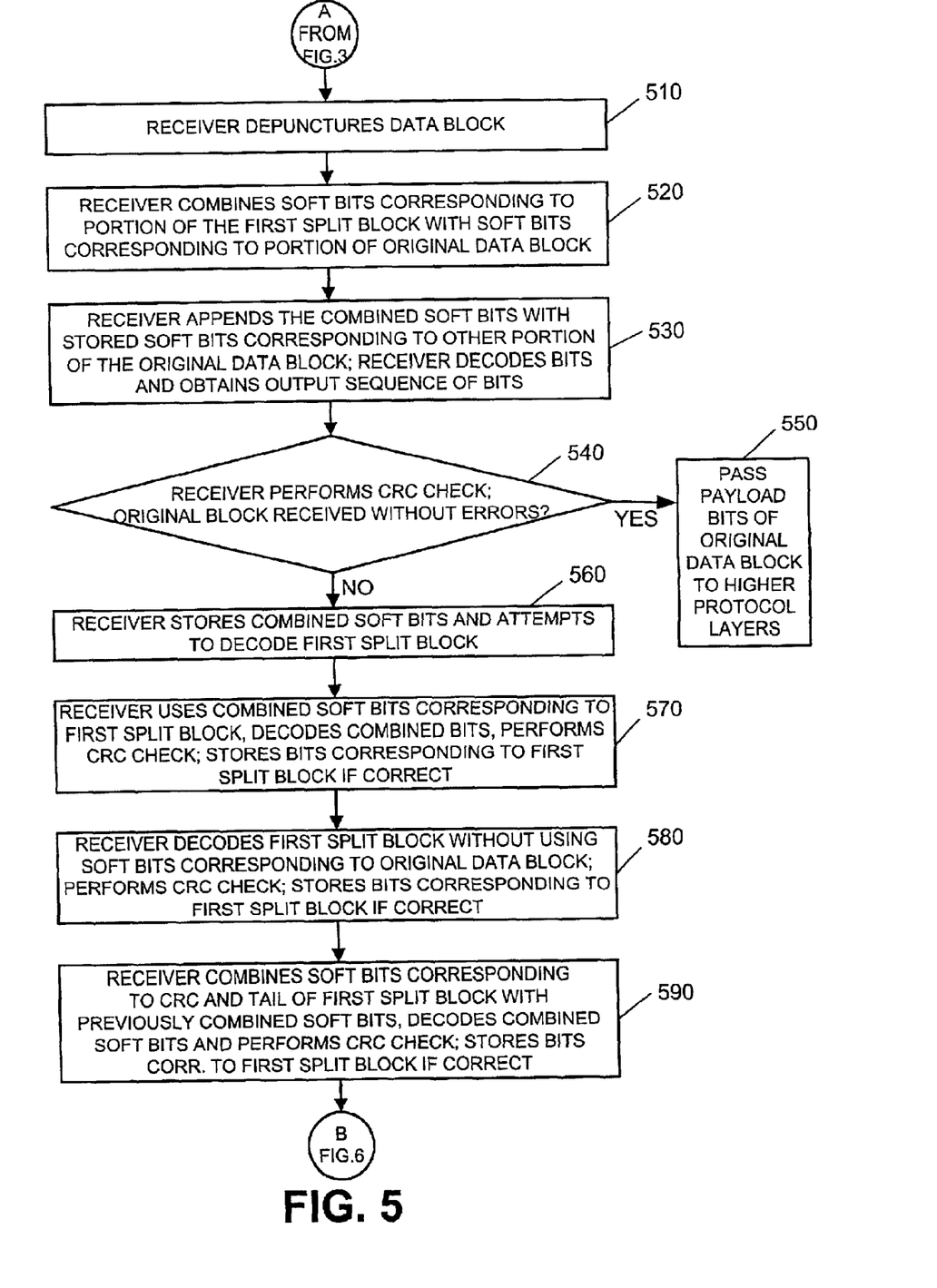
FIGS. 5 and 6 are flow diagrams illustrating exemplary processing by mobile terminals in an implementation consistent with the present invention.

The receiver, consistent with the present invention, may then combine a portion of the soft bits corresponding to data block 400 (previously stored at step 320) with the new soft bits corresponding to a portion of the data block 410 (step 520). This is in contrast to conventional systems that merely discard old soft bits when the modulation scheme changes. For example, the receiver may combine the soft bits corresponding to the F, E and the split payload 1 fields of data block 410 with the soft bits corresponding to the F, E and the first half of the payload field associated with the initially transmitted data block 400. The soft bits corresponding to the CRC and the tail fields of blocks 400 and 410, however, may not be used in the combining because the CRC of block 410 has been calculated on only a subset of the bits in block 400. The F and E fields, however, may be used in the combining since these fields will typically not change during retransmission of data block 410.

According to an exemplary implementation, the combining of the soft bits associated with data blocks 400 and 410 may be a mathematical addition of the two sets of bits. In other words, a portion of the depunctured block associated with the F, E, and split payload 1 field of block 410 may be added, bit position by bit position, to a portion of the stored bits associated with the F, E and first half of the payload of block 400.

After combining the designated bits, the receiver appends the combined soft bits with the rest of the soft bits corresponding to block 400 (i.e., the soft bits stored at step 320 that correspond to the second half of the payload of block 400 and the CRC and tail fields) (step 530). The receiver then performs a convolutional decoding operation to obtain an output sequence of bits (step 530).

The receiver then performs a CRC check on the output sequence to determine whether data block 400 was received correctly (step 540). If the CRC check indicates that block 400 was received correctly, the receiver may pass the payload bits of block 400 to higher protocol layers (step 550). The stored soft bits corresponding to data block 400 may also be discarded.

If the CRC check indicates that the block 400 was not received correctly, the receiver may store the new combined soft bits in memory, such as memory 260 (FIG. 2) (step 560). The receiver may also attempt to decode data block 410 (step 560). In this case, the receiver may use the soft bits associated with the F, E and split payload 1 field of block 410 added to the portion of the stored bits associated with the F, E and first half of payload of block 400 (step 570). The receiver may then decode the combined bits using a conventional convolutional decoding operation to obtain an output sequence of bits. The receiver may then perform a CRC check on the output sequence to determine whether data block 410 was received correctly (step 570). If the CRC check indicates that block 410 was received correctly, the receiver may store the bits corresponding to data block 410 so that they may be combined with the bits corresponding to the second split block, i.e., data block 420, at a later time (step 570).

If the CRC check at step 570 indicates that data block 410 was not received correctly, the receiver may also attempt to decode data block 410 without using the previously stored soft bits associated with the originally transmitted data block 400 (step 580). In this case, the receiver decodes the depunctured data block 410 and performs the CRC check to determine whether data block 410 was received correctly. If the CRC check fails, the soft bits may be stored for future use. If the CRC check indicates that the data block 410 was received without errors, the receiver may store the bits corresponding to data block 410 so that they may be combined with the bits corresponding to data block 420 at a later time (step 580).

If the CRC check at step 580 indicates that the block was not received correctly, the receiver may further attempt to decode block 410 using the combined soft bits stored at step 560 and a portion of the new soft bits. For example, the receiver may combine the previously combined soft bits (i.e., combined F, E and the first half of the payload field of data block 400 with F, E, and split payload 1 field of block 410) with soft bits corresponding to the CRC and the tail fields of block 410 (step 590). The receiver may then perform a decoding operation and CRC check to determine whether data block 410 was received correctly (step 590). If the CRC check indicates that data block 410 was received without errors, the receiver may store the data bits corresponding to block 410 so that they may be combined with the bits corresponding to data block 420 at a later time (step 590).

If the CRC check at step 590 fails, the transmitter may transmit a different punctured copy and retry the process. In each case, however, the receiver may use the stored soft bits to facilitate the decoding.

In summary, if the CRC check on the data corresponding to block 400 indicates that data block 400 was received correctly, the payload bits corresponding to the original data block may be passed to higher protocol layers. If the CRC check fails, the receiver may perform a number of operations to attempt to decode data block 410. If any one of the CRC checks on the data corresponding to data block 410 indicates that data block 410 was received correctly, then one half of the data bits associated with the payload field of the original data block 400 are known. If the bits in the second half of the payload are known, i.e., split payload 2 field of split block 420, the receiver may append the bits in the split payload 1 of data block 410 with the bits in split payload 2 of data block 420 and pass the combined data block on to higher protocol layers. Assume, however, that the bits in the second half of the data block are not known.

For example, suppose that the receiver receives the second of the two split blocks, i.e., data block 420, as determined by information contained in the header. Further assume that data block 420 was transmitted using the same modulation and coding scheme as data block 410 (MCS-2 and rate ⅓ convolutional coding in the example described above). Similar to the discussion regarding data block 410, the receiver demodulates the coded and punctured block corresponding to data block 420 in a conventional manner to obtain 372 soft bits and depunctures the 372 bits to obtain 732 bits (step 610, FIG. 6).

Figure 6:
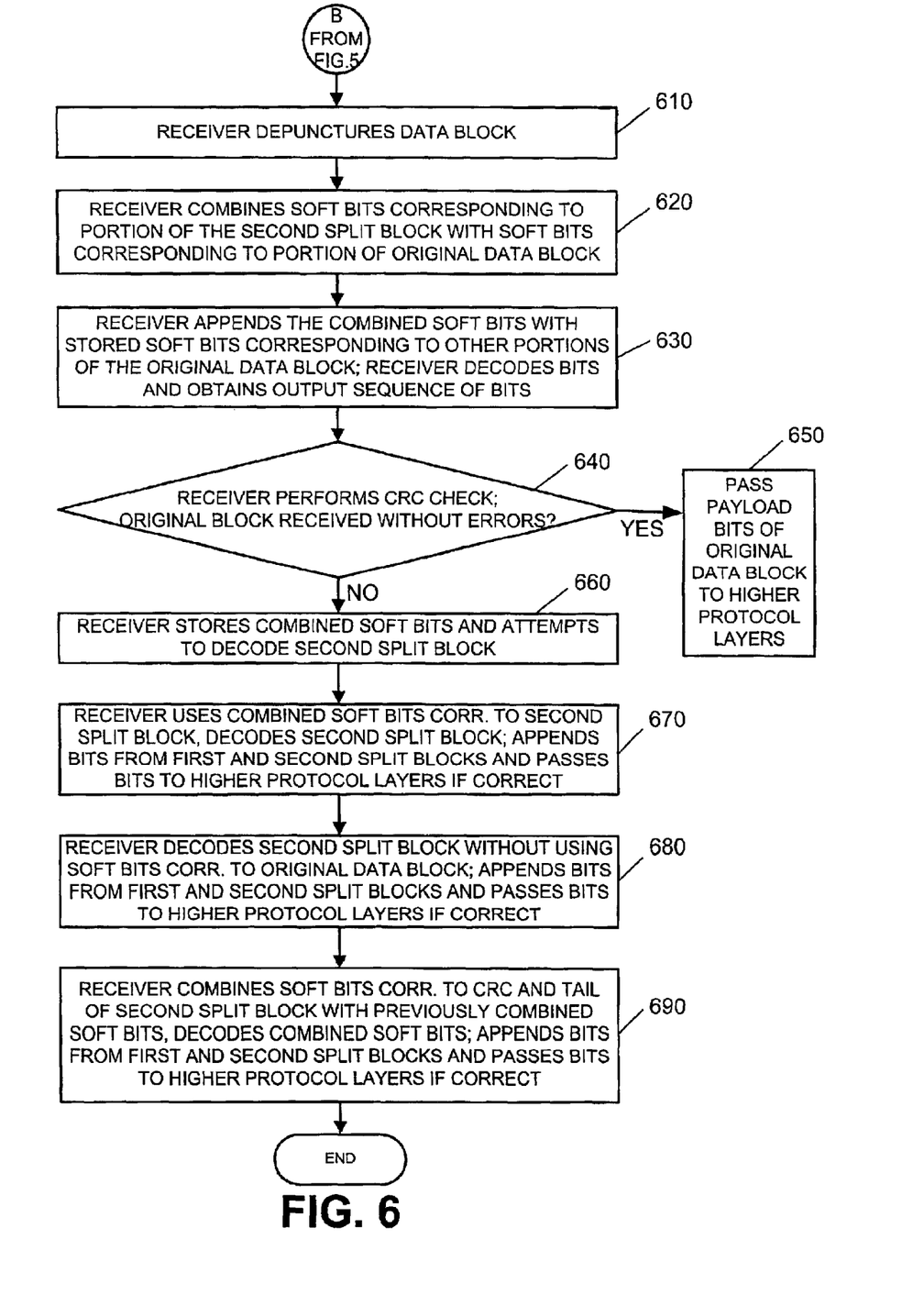

The receiver may then combine a portion of the soft bits previously stored (at step 320) with a portion of the new soft bits corresponding to data block 420 (step 620). For example, the receiver may combine the soft bits corresponding to the split payload 2 field of data block 420 with the soft bits corresponding to the second half of the payload field associated with the initially transmitted data block 400. As described previously, the combining of soft bits may be a mathematical addition of the two sets of bits. Similar to the previous discussion regarding data block 410, the soft bits corresponding to the CRC and the tail fields of blocks 400 and 420 may not be used in the soft combining.

According to an exemplary implementation of the present invention consistent with the EDGE protocol, the state of the convolutional coder used to encode the data blocks is initialized to all zeros before encoding any data block. For example, assume that the convolutional coder uses a conventional 6-bit shift register that is initialized to an all zero state. The input bits in the data block then cause the shift register to go through a series of transitions between states, at the same time producing output bits.

In this case, the state of the convolutional coder at the beginning of the second half of the payload portion of data block 400 will be determined by the last "m" bits that have passed through the encoder. That is, the state of the encoder at the beginning of the second half of the payload portion of data block 400 is based on the last "m" bits of the first half of the payload portion of data block 400, where "m" is 6 in the example above. In contrast, the state of the encoder at the beginning of the split payload 2 field of data block 420 is determined by the initial state (all zeros) and the F and E bits, rather than any of the bits in the first half of data block 410.

Therefore, the soft bits beginning with the second half of the payload of data block 400 may not be combined with the soft bits for split block 420 as was done for data block 410. In an implementation consistent with the present invention, the receiver overcomes this inconsistency between the encoding of the second half of the payload field of data block 400 and the encoding of the split payload 2 field of split block 420.

For example, assume that the memory of the encoder used to encode data blocks 400, 410 and 420 is 6 bits. It should be noted that the soft combining is done on the coded bits in a ⅓ rate convolutional coding scheme, which include three times as many bits as the payload bits. Therefore, the first 18 (6×3) soft bits associated with the second half of the payload field of data block 400 are associated with the memory of the encoder. Therefore, to ensure the state of the encoders relating to the soft combining do not take into account the state of the encoder, the first 18 bits of the second half of the payload field of data block 400 are ignored in the soft combining.

In data block 420, however, the F and E bits, which are not used in the soft combining, precede the split payload 2 field. Therefore, the first 24 (6 bits of split payload 2 field plus F and E bits or 8 bits×3) soft bits associated with data block 420 are ignored in the soft combining.

In summary, the first 18 soft bits associated with the second half of the payload field of data block 400 and the first 24 soft bits associated with the data block 420 and must pass through the encoder before the states of the encoders are consistent. Hence, the soft bits from the nineteenth bit on of the second half of the payload field of data block 400 are combined with the soft bits starting from the twenty-fifth bit on of data block 420, based on a 6-bit memory used by the encoder. This ensures that the combination of bits associated with data blocks 400 and 420 remains consistent despite the fact that the encoder may be initialized to an all zero state before encoding data block 420. After the initial 18 bits of the second half of data block 400 have passed through the encoder and the first 24 bits of the data block 420 have passed through the encoder, the state of the encoder is the same and, thus, the outputs are consistent for all succeeding inputs, until the CRC and tail fields.

After combining the designated soft bits, the receiver appends these combined soft bits with stored soft bits corresponding to other portions of block 400 (i.e., the soft bits stored at step 320 corresponding to the F and E fields and the first half of the payload of block 400) (step 630). The receiver then performs a conventional convolutional decoding operation to obtain an output sequence of bits (step 630).

The receiver then performs a CRC check on the output sequence of bits to determine whether data block 400 was received correctly (step 640). If the CRC check indicates that data block 400 was received correctly, the receiver may pass the payload bits of data block 400 to higher protocol layers (step 650). The stored soft bits corresponding to data block 400 may also be discarded.

If the CRC check indicates that data block 400 was not received correctly, the receiver may store the new combined soft bits in memory, such as memory 260 (FIG. 2) (step 660). The receiver may also attempt to decode data block 420 (step 660). In an exemplary implementation consistent with the present invention, the receiver may use the combined soft bits generated at step 620 to determine whether data block 420 was received correctly. The receiver may decode the combined bits using a conventional convolutional decoding operation to obtain an output sequence of bits. The receiver may then perform a CRC check on the output sequence to determine whether data block 420 was received correctly (step 670).

If the CRC check at step 670 indicates that data block 420 was received correctly, the receiver may append the bits corresponding to split payload 1 field of data block 410 to the bits corresponding to split payload 2 field of data block 420. The receiver may then pass the appended bits to higher protocol layers (step 670).

If the CRC check at step 670 indicates that data block 420 was not received correctly, the receiver may also attempt to decode data block 420 without using the previously stored soft bits associated with the originally transmitted data block 400 (step 680). In this case, the receiver decodes the depunctured block and performs a CRC check to determine whether data block 420 was received correctly. If the CRC check fails, the soft bits may be stored for future use. If the CRC check indicates that data block 420 was received without errors, the receiver may append the bits corresponding to split payload 1 field of data block 410 to the bits corresponding to split payload 2 field of data block 420 and pass the appended bits to higher protocol layers (step 680).

If the CRC check at step 680 indicates that data block 420 was not received correctly, the receiver may further attempt to decode data block 420 using the previously combined soft bits (i.e., combined second half of the payload field of data block 400 after the memory of the encoder with split payload 2 field of data block 420) with the soft bits corresponding to the CRC and the tail fields of block 420 (step 690).

The receiver may then perform a decoding operation and CRC check to determine whether data block 420 was received correctly (step 690). If the CRC is successful, the transmitter appends the bits corresponding to split payload 1 field with split payload 2 field of data blocks 410 and 420, respectively, and then passes the appended bits to higher protocol layers (step 690). If the CRC check fails, the receiver may transmit a different punctured copy and retry the process.

In summary, if the CRC check on the data corresponding to block 400 indicates that the block 400 was received correctly, the payload bits corresponding to the original data block may be passed to higher protocol layers. If this check fails, the receiver may perform a number of operations to attempt to decode data block 420. If any one of the CRC checks on the data corresponding to block 420 indicates that the block was received correctly, then the receiver may append the bits corresponding to split payload 1 field of data block 410 with the bits corresponding to split payload 2 field of data block 420 and pass the appended bits to higher protocol layers. These two sets of bits appended together are equivalent to the payload field of original data block 400. Therefore, the present invention uses stored soft bits corresponding to data block 400 transmitted according to one modulation scheme to aid in the decoding of data blocks 410 and 420 transmitted according to another modulation scheme.

An alternative implementation consistent with the present invention may be used when the decoding of blocks 410 and 420 described above in relation to FIGS. 5 and 6 is unsuccessful. It should be noted that the soft bits for a small portion of the data block 400 have not been modified due to the inconsistency between the state of the encoder encoding the second half of the payload of data block 400 and the state of the encoder encoding the beginning of the split payload 2 field of data block 420. In the example above, the first 18 bits of the second half of the payload field of data block 400 have not been combined with other soft bits, corresponding to the memory of the encoder.

In this case, the receiver may perform bi-directional decoding on the entire data block 400 to attempt to enhance the decoding. For example, as described above, the receiver has stored the combined soft bits corresponding to the first half of data block 400 and data block 410 and has stored the combined soft bits corresponding to the second half of data block 400 and data block 420. The receiver then appends these two sets of bits, corresponding to data block 400.

The receiver then may perform a forward decoding operation beginning with the start of data block 400 and performs a CRC check on the output. The receiver also performs a backward decoding operation on this set of bits beginning at the tail portion of data block 400 and performs a CRC check on the output. The forward and backward decoding operations may give different results. If the data block passes either one of the CRC checks, the receiver may forward the bits corresponding to the payload of data block 400 to higher protocol layers.

Alternative bi-directional decoding methods may also be used in implementations consistent with the present invention. For example, the receiver may perform bi-directional decoding for bit sequences that do not traverse the entire data block, but traverse only a little more than half the data block. In this manner, the forward decoding for a sequence of bits B1 may slightly overlap with the reverse decoding operation for a sequence of bits B2. That is, a number of bits B3 may be included in both B1 and B2. If the decoding operations relating to B1 and B2 are successful, the receiver appends the two bit sequences, but ensures that the portion of bits B3 that has been decoded in both directions is not duplicated in the output bit sequence to the higher protocol layer.

In accordance with another implementation of the present invention, the receiver may further enhance the decoding method used to decode the second of two split blocks, such as data block 420. For example, assume that the F and E bits in data block 420 are both zero. It should be noted that the F and E bits will be zeros in the majority of cases.

In this implementation, the receiver decodes the entire data block (combined soft bits associated with data block 400 and data blocks 410 and 420 appended together to form a data block) until the state corresponding to the beginning of the split payload 2 field of data block 420 is reached. As discussed in the previous implementation, the soft bits associated with the beginning of the split payload 2 field of data block 420 have not been combined with soft bits from data block 400. At this point, there are 64 surviving states, assuming that the encoder has a 6-bit memory, with each surviving state being a hypothesis for the encoder state at this time. For each such surviving state, the output bits corresponding to a given input bit (1 or 0) is known and may be calculated to advance the decoder operation. In accordance with this implementation, the receiver calculates these output bits for each of the 64 surviving states and compares the output bits of the encoder for these states to the outputs generated when the starting state at the beginning of the second half of the block is all-zero, as would be the case when block 420 was encoded. The soft bits from data block 420 may then be modified in sign using this comparison and then combined with the stored soft bits corresponding to the second half of the payload of data block 400. It should be understood that this combination is different for each surviving state and for each input bit value.

Further in a trellis decoder, the sequence of input bits leading to a certain state is known and the number of bits beyond the beginning of the second half of the data block is also known. Thus, the output of the encoder starting from the all-zero state with these input bits can be found, compared to the output from the state under consideration, and the soft bits combined appropriately. For example, the soft bits may be added when the output bits are the same and subtracted when they are different. In an exemplary implementation, if the state under consideration is xxx110 (where "x" is any bit), and the decoder is three stages beyond the beginning of the second half of the data block, the output of the encoder from state 000110 may be used for comparison. The state 000110 is the state which results if the decoding process started from the all-zero state. Thus, within the memory of the encoder, combining of soft bits may be done on a per-survivor basis. Once the memory of the encoder has been passed, normal operation of the decoder can resume.

In another implementation consistent with the present invention, a maximum a posteriori probability (MAP)

decoder may be used in place of a Viterbi decoder to decode the data blocks. The MAP decoder produces at its output, probabilities that the input bits to the convolutional encoder are either one or zero. By storing these probabilities, rather than the soft bits corresponding to the output, storage requirements may be reduced. When a new split block arrives, the previously stored probabilities may be used as a priori probabilities for a MAP decoder for the split block, which generates a certain output. The receiver quantizes the output to binary, appends the quantized binary probabilities corresponding to the other split block and performs a CRC check.

If the CRC checks, then the data block has been received correctly, and can be sent to higher protocol layers. If not, new probabilities may be obtained for one half of the data block. The new probabilities may then be combined with the previous probabilities to further refine the information for the MAP decoder. The MAP decoder may then generate a new output based on the refined probabilities. The receiver quantizes the new output and performs a CRC check. It should be understood that since this method is based on the probabilities of the input bits rather than on output bit soft values, there are no issues associated with bits inside the encoder memory, as was the case in other implementations.

The previous examples described above relate to receiving two split blocks in MCS-2 after an original data block was transmitted in MCS-7. It should be understood, however, that the present invention may be used with any modulation schemes and other numbers of split blocks. In summary, the mobile terminal 110 may combine bits or other information generated by demodulating data blocks transmitted via different modulation schemes to aid in decoding the data blocks.

The foregoing description of the embodiments of the present invention provides illustration and description, but is not intended to be exhaustive or to limit the invention to the precise form disclosed. Modifications and variations are possible in light of the above teachings or may be acquired from practice of the invention.

For example, the present invention has been described in the context of a mobile terminal. The present invention, however, may be implemented in other devices or systems, such as a base station. Further, while series of steps have been described with respect to FIGS. 3, 5 and 6, the order of the steps may be varied in other implementations consistent with the present invention. No element, step, or instruction used in the description of the present application should be construed as critical or essential to the invention unless explicitly described as such.

Additionally, the present invention may be embodied as cellular communication systems, methods, and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. The computer-usable or computer-readable medium may be, for example, but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a RAM, a ROM, an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In addition, the present invention is described herein in the context of an EGPRS cellular communication system operating according to the EDGE protocol. While the present invention may be particularly useful for improving the performance of EGPRS cellular networks, it should be understood that the principles of the present invention may be applied to any cellular or wireless system utilizing other air interfaces. It should be further understood that the principles of the present invention may be utilized in hybrid systems that are combinations of two or more of the above air interfaces. In addition, a mobile terminal, in accordance with the present invention, may be designed to communicate with a base station transceiver using any standard based on GSM, TDMA, CDMA, FDMA, a hybrid of such standards or any other standard.

The scope of the invention is defined by the claims and their equivalents.

What is claimed is:

1. A method for decoding data blocks, comprising:
   demodulating a first data transmission transmitted via a first modulation scheme to obtain a first sequence of bits, the first sequence of bits representing a first data block comprising a first payload;
   detecting an error associated with the first data block;
   storing the first sequence of bits;
   demodulating a second data transmission transmitted via a second modulation scheme to obtain a second sequence of bits, the second sequence of bits representing a second data block comprising a second payload, the second payload comprising at least a portion of the first payload;
   combining a portion of the first sequence of bits with a portion of the second sequence of bits to obtain a third sequence of bits;
   appending an other portion of the first sequence of bits to the third sequence of bits to obtain a fourth sequence of bits; and
   decoding the fourth sequence of bits to obtain the first data block.

2. The method of claim 1, wherein the first and second data blocks are punctured before being transmitted, the method further comprising:
   depuncturing the first sequence of bits; and
   depuncturing the second sequence of bits;
   wherein the combining a portion of the first sequence of bits with a portion of the second sequence of bits comprises:
      adding portions of the depunctured second sequence of bits to corresponding portions of the depunctured first sequence of bits.

3. The method of claim 1, further comprising:
determining whether an error exists with regard to the fourth sequence of bits.

4. The method of claim 1, wherein the portion of the first sequence of bits comprises higher protocol layer information and a portion of the first payload and the other portion of the first sequence of bits comprises an other portion of the first payload.

5. The method of claim 4, wherein the portion of the second sequence of bits corresponds to higher protocol layer information and the second payload; and
wherein the combining a portion of the first sequence of bits with a portion of the second sequence of bits comprises:
adding the portion of the first sequence of bits with a corresponding portion of the second sequence of bits.

6. The method of claim 1, further comprising:
determining whether the fourth sequence of bits contains an error; and
decoding the third sequence of bits to obtain the second data block, when the fourth sequence of bits contains an error.

7. The method of claim 6, further comprising:
detecting an error in the second data block; and
combining the third sequence of bits with an other portion of the second sequence of bits to obtain a fifth sequence of bits, the other portion of the second sequence of bits corresponding to an error check field and higher protocol layer information.

8. The method of claim 1, further comprising:
detecting an error in the fourth sequence of bits;
demodulating a third data transmission transmitted via the second modulation scheme to obtain a fifth sequence of bits, the fifth sequence of bits representing a third data block comprising a third payload, the third payload comprising a portion of the first payload;
combining a portion of the first sequence of bits with a portion of the fifth sequence of bits to obtain a sixth sequence of bits;
appending an other portion of the first sequence of bits to the sixth sequence of bits to obtain a seventh sequence of bits; and
decoding the seventh sequence of bits to obtain the first data block.

9. The method of claim 8, further comprising:
determining whether the seventh sequence of bits contains an error; and
decoding the sixth sequence of bits to obtain the third data block, when the seventh sequence of bits contains an error.

10. The method of claim 1, further comprising:
determining whether an error exists in the four sequence of bits;
decoding the third sequence of bits to obtain the second data block, when an error exists in the fourth sequence of bits;
demodulating a third data transmission transmitted via the second modulation scheme to obtain a fifth sequence of bits, the fifth sequence of bits representing a third data block comprising a third payload, the third payload comprising a portion of the first payload;
combining a portion of the first sequence of bits with a portion of the fifth sequence of bits to obtain a sixth sequence of bits;
decoding the sixth sequence of bits to obtain the third data block; and
appending a sequence of bits representing the second payload to a sequence of bits representing the third payload when no error exists in either the second or third data blocks, the appended second and third payloads corresponding to the first payload.

11. A device for decoding data blocks, comprising:
a receiver that receives data transmissions;
a demodulator coupled to the receiver, the demodulator:
demodulating a first data transmission transmitted via a first modulation scheme to obtain a first sequence of bits, the first sequence of bits representing a first data block comprising a first payload, and
demodulating, after the first data transmission, a second data transmission transmitted via a second modulation scheme to obtain a second sequence of bits, the second sequence of bits representing a second data block comprising a second payload, the second payload comprising a portion of the first payload;
an error detector that determines whether an error exists in the first data block;
a memory that stores the first sequence of bits when an error in the first data block is detected;
a combiner that combines a portion of the first sequence of bits with a portion of the second sequence of bits to obtain a third sequence of bits and appends an other portion of the first sequence of bits to the third sequence of bits to obtain a fourth sequence of bits; and
a decoder that decodes the fourth sequence of bits to obtain the first data block.

12. The device of claim 11, wherein the first and second data blocks are punctured before being transmitted, the device further comprising:
a depuncturing circuit that:
depunctures the first sequence of bits, and
depunctures the second sequence of bits;
wherein when combining, the combiner adds portions of the depunctured second sequence of bits with corresponding portions of the depunctured first sequence of bits.

13. The device of claim 11, wherein the error detector further determines whether an error exists in the fourth sequence of bits.

14. The device of claim 11, wherein the portion of the first sequence of bits corresponds to higher protocol layer information and a portion of the first payload and the other portion of the first sequence of bits comprises an other portion of the first payload.

15. The device of claim 14, wherein the portion of the second sequence of bits corresponds to higher protocol layer information and the second payload, wherein when combining, the combiner adds the portion of the first sequence of bits with a corresponding portion of the second sequence of bits.

16. The device of claim 11, wherein the decoder further:
decodes the third sequence of bits to obtain the second data block, when the fourth sequence of bits contains an error.

17. The device of claim 16, wherein the combiner:
combines the third sequence of bits with an other portion of the second sequence of bits to obtain a fifth sequence of bits, when the second data block contains an error, the other portion of the sequence of bits corresponding to an error check field and higher protocol layer information.

18. The device of claim 11, wherein when the error detector determines that an error exists in the fourth sequence of bits:
- the demodulator demodulates a third data transmission transmitted via the second modulation scheme to obtain a fifth sequence of bits, the fifth sequence of bits representing a
- third data block comprising a third payload, the third payload comprising a portion of the first payload,
- the combiner combines a portion of the first sequence of bits with a portion of the fifth sequence of bits to obtain a sixth sequence of bits and appends an other portion of the first sequence of bits to the sixth sequence of bits to obtain a seventh sequence of bits, and
- the decoder decodes the seventh sequence of bits to obtain the first data block.

19. The device of claim 18, wherein the error detector further determines whether an error exists in either seventh sequence of bits, and
- the decoder decodes the sixth sequence of bits to obtain the third data block, when the seventh sequence of bits contains an error.

20. The device of claim 11, wherein when the error detector determines that an error exists in the fourth sequence of bits:
- the decoder decodes the third sequence of bits to obtain the second data block,
- the demodulator demodulates a third data transmission transmitted via the second modulation scheme to obtain a fifth sequence of bits, the fifth sequence of bits representing a third data block comprising a third payload, the third payload comprising a portion of the first payload,
- the combiner combines a portion of the first sequence of bits with a portion of the fifth sequence of bits to obtain a sixth sequence of bits,
- the decoder decodes the sixth sequence of bits to obtain the third data block, and
- the combiner appends a sequence of bits representing the second payload to a sequence of bits representing the third payload when no error exists in either the second or third data blocks, the appended second and third payloads corresponding to the first payload.

21. A computer-readable medium having stored thereon a plurality of sequences of instructions, said instructions comprising sequences of instructions which, when executed by at least one processor, cause said processor to:
- demodulate a first data transmission transmitted via a first modulation scheme to obtain a first sequence of bits, the first sequence of bits representing a first data block comprising a first payload;
- detect an error associated with the first data block;
- store the first sequence of bits;
- demodulate a second data transmission transmitted via a second modulation scheme to obtain a second sequence of bits, the second sequence of bits representing a second data block comprising a second payload, the second payload comprising a portion of the first payload;
- combine a portion of the first sequence of bits with a portion of the second sequence of bits to obtain a third sequence of bits;
- append an other portion of the first sequence of bits to the third sequence of bits to obtain a fourth sequence of bits; and
- decode the fourth sequence of bits to obtain the first data block.

22. The computer-readable medium of claim 21, further comprising instructions for causing said processor to:
- detect an error in the fourth sequence of bits;
- demodulate a third data transmission transmitted via the second modulation scheme to obtain a fifth sequence of bits, the fifth sequence of bits representing a third data block comprising a third payload, the third payload comprising a portion of the first payload;
- combine a portion of the first sequence of bits with a portion of the fifth sequence of bits to obtain a sixth sequence of bits;
- append an other portion of the first sequence of bits to the sixth sequence of bits to obtain a seventh sequence of bits; and
- decode the seventh sequence of bits to obtain the first data block.

23. The computer-readable medium of claim 21, further comprising instructions for causing said processor to:
- detect whether an error exists in the fourth sequence of bits;
- decode the third sequence of bits to obtain the second data block, when the fourth sequence of bits contains an error;
- demodulate a third data transmission transmitted via the second modulation scheme to obtain a fifth sequence of bits, the fifth sequence of bits representing a third data block comprising a third payload, the third payload comprising a portion of the first payload;
- combine a portion of the first sequence of bits with a portion of the fifth sequence of bits to obtain a sixth sequence of bits; decode the sixth sequence of bits to obtain the third data block; and
- append a portion of the bits in the second data block representing the second payload to a portion of the bits in the third data block representing the third payload, the appended second and third payloads corresponding to the first payload.

24. A method for decoding data blocks, comprising:
- demodulating a first data block transmitted via a first modulation scheme to obtain a first set of soft bits associated with the first data block;
- detecting an error in the first data block;
- transmitting a negative acknowledgement message to a transmitting device;
- storing the first set of soft bits;
- demodulating a second data block transmitted via a second modulation scheme to obtain a second set of soft bits associated with the second data block;
- identifying the second data block as being part of a split data block;
- combining a portion of the first set of soft bits with a portion of the second set of soft bits to obtain a first sequence of bits;
- appending an other portion of the first set of soft bits to the first sequence of bits to obtain a second sequence of bits; and
- decoding the second sequence of bits to obtain the first data block.

25. The method of claim 24, wherein the first and second data blocks are transmitted according to enhanced data rates for global system for mobile communications and time division multiple access evolution (EDGE) protocol, the portion of the first set of soft bits correspond to an F field, an E field and a portion of a payload of the first data block, the portion of the second set of soft bits correspond to an F field, an E field and a payload of the second data block and the other portion of the first set of soft bits correspond to the remaining portion of the payload of the first data block, a cyclic redundancy check field and a tail field.

26. The method of claim 24, further comprising:
    determining whether an error exists in the second sequence of bits; and
    decoding the first sequence of bits to obtain the second data block when an error exists in the second sequence of bits.

27. The method of claim 24, further comprising:
    detecting an error in the second sequence of bits;
    demodulating a third data block transmitted via the second modulation scheme to obtain a third set of soft bits;
    identifying the third data block as part of the split data block;
    combining a portion of the first set of stored soft bits with a portion of the third set of soft bits to obtain a third sequence of bits; and
    appending an other portion of the first set of soft bits to the third sequence of bits to obtain a fourth sequence of bits; and
    decoding the fourth sequence of bits to obtain the first data block.

28. The method of claim 27, wherein the combining a portion of the first set of stored soft bits with a portion of the third set of soft bits to obtain a third sequence of bits comprises:
    omitting a predetermined number of bits in the combining to obtain the third sequence of bits, the predetermined number of bits relating to a memory of an encoder used to encode the first and third data blocks.

29. The method of claim 28, wherein the predetermined number of bits include bits corresponding to a first portion of a second half of a payload field of the first data block.

30. The method of claim 29, wherein the predetermined number of bits include bits corresponding to an F field and an E field and a first portion of a payload field of the third data block.

31. A device for decoding data blocks, comprising:
    a memory for storing soft bits generated by demodulating data blocks; and
    a receiver that:
        demodulates a first data block transmitted via a first modulation scheme,
        transmits a negative acknowledgement message to a transmitting device, when an error is detected in the first data block,
        demodulates a second data block transmitted via a second modulation scheme,
        identifies the second data block as being part of a split data block,
        combines a portion of the soft bits associated with the first data block with a portion of the soft bits associated with the second data block to obtain a first sequence of bits,
        appends an other portion of the soft bits associated with the first data block to the first sequence of bits to obtain a second sequence of bits, and
        decodes the second sequence of bits to obtain the first data block.

32. The device of claim 31, wherein the receiver:
    detects an error in the second sequence of bits, and
    decodes the first sequence of bits to obtain the second data block when an error exists in the second sequence of bits.

33. The device of claim 31, wherein the receiver:
    detects an error in the second sequence of bits,
    demodulates a third data block transmitted via the second modulation scheme,
    identifies the third data block as being part of the split data block,
    combines a portion of the soft bits associated with the first data block with a portion of the soft bits associated with the third data block to obtain a third sequence of bits,
    appends an other portion of the first set of soft bits to the third sequence of bits to obtain a fourth sequence of bits, and
    decodes the fourth sequence of bits to obtain the first data block.

34. The device of claim 33, wherein the receiver:
    detects an error in the first data block.
    decodes the first sequence of bits to obtain the second data block,
    decodes the third sequence of bits to obtain the third data block, and
    appends a sequence of bits representing a payload of the second data block with a sequence of bits representing a payload of third data block, the appended bits representing a payload of the first data block.

35. A mobile terminal, comprising:
    a memory that stores data bits generated by demodulating data blocks; and
    a receiver that:
        demodulates a first data block comprising a first payload, the first data block transmitted via an eight phase shift keying (8PSK) modulation scheme,
        detects an error in the first data block,
        stores a first set of bits associated with the first data block in the memory,
        transmits a negative acknowledgement message to a transmitting device that transmitted the first data block, when an error is detected,
        demodulates a second data block transmitted via a Gaussian minimum shift keying (GMSK) modulation scheme to obtain a second set of bits, the second data block comprising a second payload comprising a portion of the first payload,
        combines a portion of the second set of bits with a portion of the first set of bits to obtain a first sequence of bits,
        appends an other portion of the first set of bits to the first sequence of bits to obtain a second sequence of bits, and
        decodes the second sequence of bits to obtain the first data block.

36. The mobile terminal of claim 35, wherein the receiver further:
    demodulates a third data block transmitted via a GMSK modulation scheme to obtain a third set of bits, the third data block having a third payload comprising a second half of the first payload,
    combines a portion of the third set of bits with a portion of the first set of bits to obtain a third sequence of bits,
    appends an other portion of the first set of bits to the third sequence of bits to obtain a fourth sequence of bits, and
    decodes the fourth sequence of bits to obtain the first data block.

37. A method for decoding a plurality of data blocks, each of the plurality of data blocks comprising a portion of a payload of a first data block transmitted via a first modulation scheme, the method comprising:

demodulating the plurality of data blocks to generate a plurality of sequences of bits for each data block, the plurality of data blocks transmitted via a second modulation scheme;

combining one of the plurality of sequences of bits with a portion of stored data bits associated with the first data block;

appending the remaining portion of the stored data bits to the results of the combining; and decoding the results of the appending to obtain the first data block.

38. The method of claim 37, further comprising:

detecting an error in the first data block;

decoding the plurality of data blocks using at least a portion of the stored data bits associated with first data block; and appending a portion of the decoded bits associated with each of the plurality of data blocks, the appended bits representing the payload of the first data block.

39. A method for decoding a plurality of data blocks, each of the plurality of data blocks comprising a portion of a payload of a first data block transmitted via a first modulation scheme, the method comprising:

demodulating a first data block transmitted via a first modulation scheme to obtain a first set of soft bits;

demodulating second and third data blocks transmitted via a second modulation scheme to obtain a second and third set of soft bits, respectively;

combining a portion of the first set of soft bits with a portion of each of the second set and third set of soft bits, respectively, to obtain a first sequence of bits; and performing a bi-directional decoding on the first sequence of bits to obtain the first data block.

40. The method of claim 39, wherein the performing a bi-directional decoding on the first sequence of bits to obtain the first data block comprises:

performing a first decoding operation beginning at a first end of the first sequence of bits, the first end representing a beginning of the first data block; and performing a second decoding operation beginning at a second end of the first sequence of bits, the second end presenting a tail portion of the first data block.

41. The method of claim 40, further comprising:

determining whether either one of the first and second decoding operations results in no errors, wherein a sequence of bits generated by an error free decoding represents the first data block.

42. A device for decoding data blocks, comprising:

a memory that stores first probability information associated with a demodulated first data block;

a MAP decoder that:

receives an input bit sequence corresponding to a second data block, the first and second data blocks being transmitted via different modulation schemes and the second data block comprising a portion of the first data block, and outputs second probability information associated with the second data block using the first probability information; and a processing device that converts the output from the MAP decoder to a binary, sequence of bits representing the first data block.

43. The device of claim 42, wherein the MAP decoder:

receives an input bit sequence corresponding to a third data block, the second and third data blocks being transmitted via a same modulation scheme and the third data block comprising a portion of the first data block, and outputs third probability information associated with the third data block using the first probability information, and the processing device:

converts the output from the MAP decoder to a binary sequence of bits representing the first data block, and determines whether an error exists in the first data block.

44. A method for decoding data blocks, comprising:

demodulating a first data block transmitted via a first modulation scheme to obtain a first set of soft bits associated with the first data block, the first data block having a first payload;

detecting an error in the first data block;

storing the first set of soft bits;

demodulating a second data block and a third data block transmitted via a second modulation scheme to obtain a second and a third set of soft bits associated with the second and third data blocks, respectively, the second and third data blocks each comprising a portion of the first payload;

combining a portion of the first set of soft bits with a portion of the second set of soft bits to obtain a fourth set of soft bits;

decoding the fourth set of soft bits to a point corresponding to the beginning of the third data block;

calculating output bits at the point corresponding to the beginning of the third data block for each of a number of surviving states relating to the memory of an encoder that encoded the first data block;

comparing the calculated output bits to output bits generated when the starting state of the encoder for the third data block is known;

modifying the third set of soft bits based on the comparison;

combining the modified third set of soft bits to at least one of a portion of the first or fourth set of the soft bits associated with the second half of the first payload to obtain a fifth set of soft bits; and decoding the fifth set of soft bits.

45. The method of claim 44, wherein the result of decoding the fourth set of soft bits comprises a first half of the first payload and the result of decoding the fifth set of soft bits comprises a second half of the first payload, the method further comprising:

appending bits representing the first half of the first payload to bits representing the second half of the first payload, the appended bits representing the first payload.

* * * * *